(12) United States Patent
Manabe et al.

(10) Patent No.: US 8,804,375 B2
(45) Date of Patent: Aug. 12, 2014

(54) PWM-PSM CONTROLLED POWER SUPPLY WITH AUXILIARY SWITCHING CIRCUIT FOR SOFT-SWITCHING

(75) Inventors: Haruhiko Manabe, Osaka (JP); Tetsuya Etoh, Osaka (JP); Hirotsune Tajima, Osaka (JP); Kazutoshi Nagami, Osaka (JP); Masayoshi Kureha, Osaka (JP)

(73) Assignee: Daihen Corporation, Osaka-shi (JP)

( * ) Notice: Subject to any disclaimer, the term of this patent is extended or adjusted under 35 U.S.C. 154(b) by 479 days.

(21) Appl. No.: 13/306,398

(22) Filed: Nov. 29, 2011

(65) Prior Publication Data

US 2012/0140524 A1    Jun. 7, 2012

(30) Foreign Application Priority Data

Dec. 1, 2010   (JP) ................................. 2010-268217
Oct. 11, 2011  (JP) ................................. 2011-224248

(51) Int. Cl.
*H02M 3/335*  (2006.01)
*H02M 3/337*  (2006.01)
*H02M 1/00*   (2006.01)
*H02M 7/5387* (2007.01)

(52) U.S. Cl.
CPC .......... *H02M 3/3378* (2013.01); *Y02B 70/1491* (2013.01); *H02M 2001/0058* (2013.01); *H02M 2007/53878* (2013.01); *Y02B 70/16* (2013.01); *H02M 2001/0032* (2013.01)
USPC .............................................. 363/17; 363/98

(58) Field of Classification Search
CPC ................... H02M 2001/0058; H02M 7/4807; H02M 7/5387
USPC ..................................... 363/17, 74, 78, 95–98
See application file for complete search history.

(56) References Cited

U.S. PATENT DOCUMENTS

| 6,341,078 | B1 * | 1/2002 | Miller ............................. 363/98 |
| 6,687,136 | B2 * | 2/2004 | Morimoto et al. ............... 363/98 |
| 7,173,404 | B2 * | 2/2007 | Wu ................................. 363/95 |
| 2005/0078491 | A1 * | 4/2005 | Song et al. ..................... 363/17 |
| 2013/0126482 | A1 * | 5/2013 | Etoh et al. ...................... 363/37 |

FOREIGN PATENT DOCUMENTS

JP    2006-280120    10/2006

* cited by examiner

*Primary Examiner* — Adolf Berhane
*Assistant Examiner* — Jye-June Lee
(74) *Attorney, Agent, or Firm* — Caesar, Rivise, Bernstein, Cohen & Pokotilow, Ltd.

(57) ABSTRACT

A power supply that performs output PWM control and PSM control. The PWM control is performed when the required output is such that a control signal is set with a larger ON pulse width than a predetermined narrow pulse width allowing for sufficient activation of switching elements in an inverter circuit and an auxiliary switching circuit. The PSM control is performed when the required output is such that the control signal for each switching element is set with a smaller ON pulse width than the predetermined narrow pulse width. The PSM control adjusts the phase of a control pulse signal so that the ON pulse is fixed to the predetermined narrow pulse width.

10 Claims, 5 Drawing Sheets

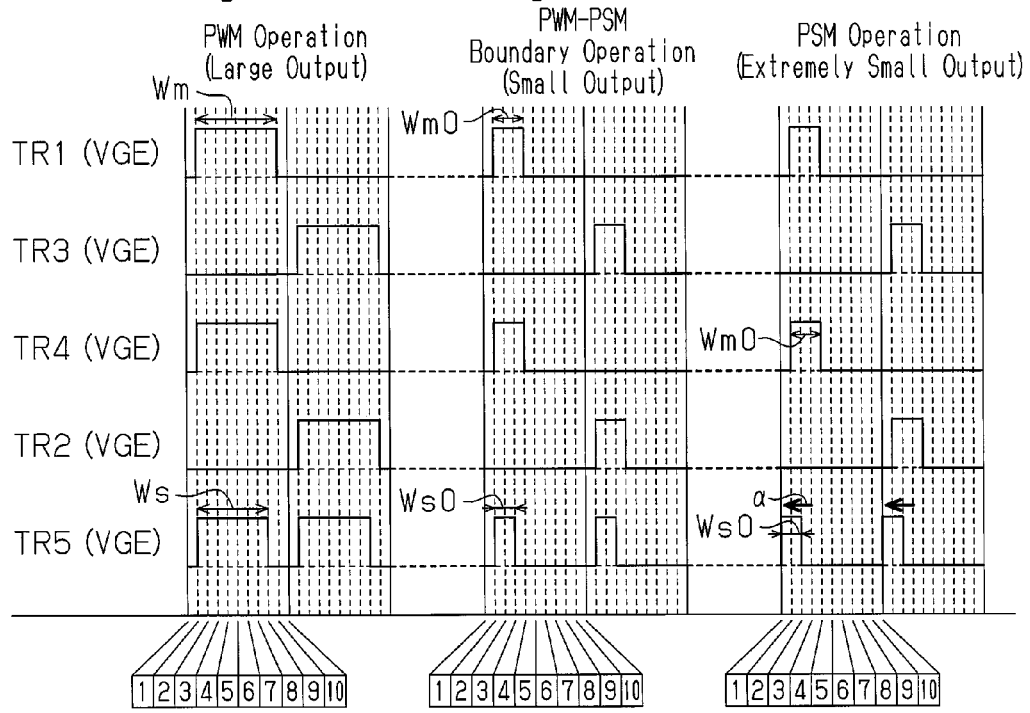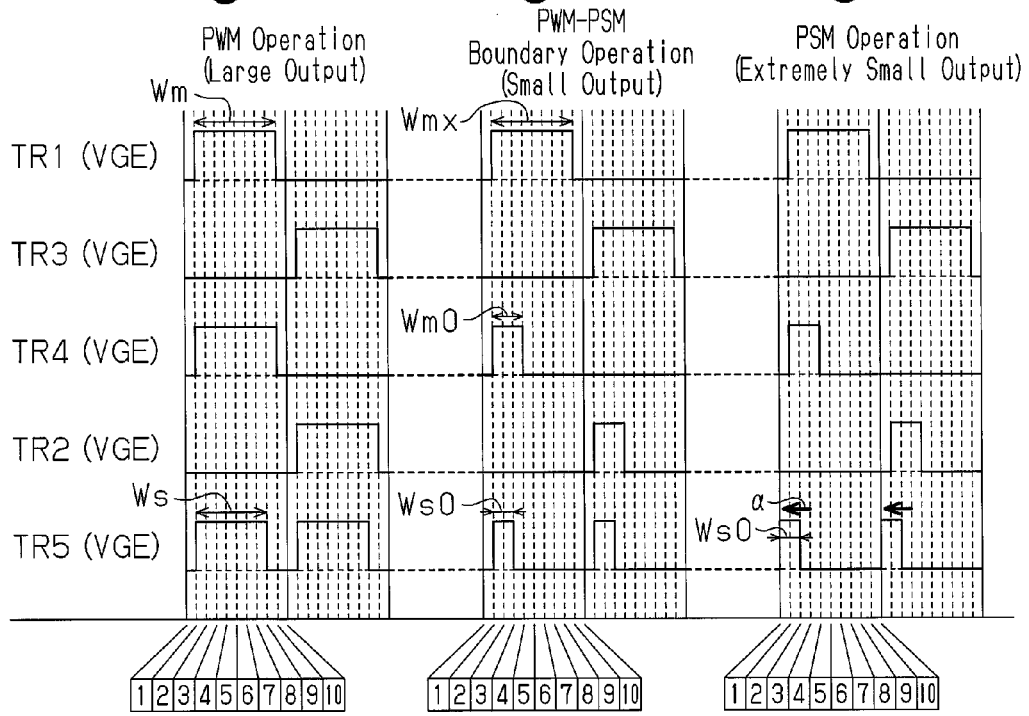

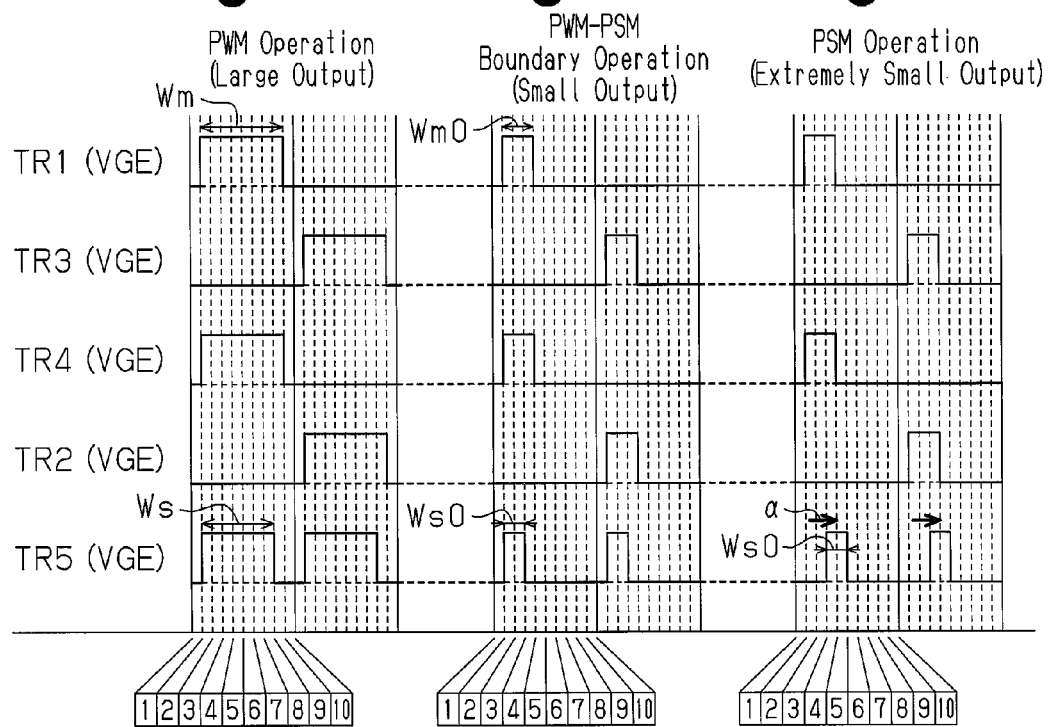

PWM-PSM CONTROLLED POWER SUPPLY WITH AUXILIARY SWITCHING CIRCUIT FOR SOFT-SWITCHING

CROSS-REFERENCE TO RELATED APPLICATIONS

This application is based upon and claims the benefit of priority from prior Japanese Patent Application No. 2010-268217, filed on Dec. 1, 2010 and prior Japanese Patent Application No. 2011-224248, filed on Oct. 11, 2011, the entire contents of which are incorporated herein by reference.

BACKGROUND OF THE INVENTION

The present invention relates to a power supply and an arc processing power supply including an inverter circuit that converts DC power into predetermined high frequency AC power.

A power supply for an arc processing machine or the like generates DC power from input AC power and converts the DC power to high frequency AC power by performing a switching operation with an inverter circuit. The power supply uses a welding transformer to adjust the voltage of the high frequency AC power. Then, a downstream circuit converts the voltage-adjusted high frequency AC power to DC output power that is suitable for arc welding or the like. The output voltage is adjusted by controlling the switching operation of the inverter circuit.

Japanese Laid-Open Patent Publication No. 2006-280120 describes an example of a power supply including an inverter circuit configured by two pairs of switching elements. Two control pulse signals are provided to the two pair of switching elements so that the pairs of switching elements are alternately activated and deactivated. Phase shift modulation (PSM) control is performed so that the phase of the control pulse signal provided to the first pair of switching elements is shifted from the phase of the control pulse signal provided to the second pair of switching elements. More specifically, the phase difference between the control pulse signal provided to the first pair and the control pulse signal provided to the second pair is controlled (ON pulse width is fixed) to adjust the time during which corresponding switching elements of the first and second pairs are simultaneously activated. This adjusts the average voltage of the high frequency AC power output from the inverter circuit. In other words, the output voltage of the power supply is adjusted.

Further, the power supply includes a rectification-smoothing circuit that converts input AC power to DC power. An auxiliary switching element is arranged along a power line between the rectification-smoothing circuit and the inverter circuit. Activation and deactivation of the auxiliary switching element is performed in cooperation with the switching elements of the inverter circuits, and charging and discharging of the auxiliary capacitor is performed accordingly. This is referred to as soft switching control and reduces switching losses in the auxiliary switching element and the inverter circuit switching elements.

When a typical pulse width modulation (PWM) control is performed so that the output voltage of the power supply is adjusted to be extremely small, a control pulse signal having an extremely narrow ON pulse width is set. This may hinder activation of a switching element and result in an unstable output or biased magnetization.

In contrast, when PSM control is performed so that the output voltage of the power supply is adjusted to be extremely small, the two control pulse signals have a large phase difference and a sufficiently wide ON pulse width. In this case, the pulse width is fixed so that the maximum output can be generated. This ensures activation of the switching elements and avoids the problems of unstable output or biased magnetization.

However, since the ON pulse width is set to be sufficiently wide so that the maximum output can be generated, when the phase difference between two control pulse signals becomes large, after one of the two switching elements is deactivated, the activated time of the other one of the two switching elements becomes long. In particular, when extremely small output power is required, the activation time of the other switching element becomes long. This lengthens the time during which return current is produced in the inverter circuit. Conduction loss caused by the return current is increased. Thus, power is not efficiently used.

It is an object of the present invention to provide a power supply and an arc processing power supply that stabilizes output when the output is low and contributes to efficient power consumption.

SUMMARY OF THE INVENTION

One aspect of the present invention is a power supply including first and second power lines. An inverter circuit includes two pairs of switching elements connected between the first power line and the second power line. The inverter circuit performs a switching operation that alternately activates and deactivates the two pairs of switching elements, and the inverter circuit converts input DC power to high frequency AC power. An auxiliary switching circuit includes an auxiliary switching element and an auxiliary capacitor. The auxiliary switching element is operated in cooperation with the switching operation of the inverter circuit. The auxiliary switching element includes a first terminal connected to the first power line and a second terminal that receives the DC power. The auxiliary capacitor is connected between the first terminal of the auxiliary switching element and the second power line. The power supply performs output control, which controls the switching operation of the inverter circuit to adjust output power that is supplied to a load, and soft switching control, which deactivates the auxiliary switching element before the two pairs of switching elements to reduce switching loss of the two pairs of switching elements. A pulse width modulation control unit adjusts ON pulse widths of two pairs of control signals respectively provided to the two pairs of switching elements and adjusts an ON pulse width of an auxiliary control pulse signal provided to the auxiliary switching element in accordance with the two pairs of control pulse signals. A phase shift control unit adjusts a phase difference of the control pulse signals in each pair provided to the two pairs of switching elements or adjusts a phase difference of the two pairs of control pulse signals and the auxiliary control pulse signal. A control switching unit selectively switches the pulse width modulation control unit and the phase shift control unit so that the pulse width modulation control unit operates when a relatively large output power is required and the phase shift control means operates when a relatively small output power is required.

BRIEF DESCRIPTION OF THE DRAWINGS

The invention, together with objects and advantages thereof, may best be understood by reference to the following description of the presently preferred exemplary embodiments together with the accompanying drawings in which:

FIGS. 2(a) to 2(c) are voltage-current waveform charts for different parts of the power supply of the first exemplary embodiment, in which FIG. 2(a) is a chart for a PWM operation (maximum output), FIG. 2(b) is a chart for a PWM-PSM boundary operation (small output), and FIG. 2(c) is for a PSM operation (extremely small output);

FIGS. 4(a) to 4(c) are voltage-current waveform charts for different parts of a power supply according to a second exemplary embodiment of the present invention, in which FIG. 4(a) is a chart for a PWM operation (maximum output), FIG. 4(b) is a chart for a PWM-PSM boundary operation (small output), and FIG. 4(c) is for a PSM operation (extremely small output);

FIGS. 5(a) to 5(c) are voltage-current waveform charts for different parts of a power supply according to a third exemplary embodiment of the present invention, in which FIG. 5(a) is a chart for a PWM operation (maximum output), FIG. 5(b) is a chart for a PWM-PSM boundary operation (small output), and FIG. 5(c) is for a PSM operation (extremely small output); and FIGS. 6(a) to 6(c) are voltage-current waveform charts for different parts of a power supply according to a fourth exemplary embodiment of the present invention, in which FIG. 6(a) is a chart for a PWM operation (maximum output), FIG. 6(b) is a chart for a PWM-PSM boundary operation (small output), and FIG. 6(c) is for a PSM operation (extremely small output).

DESCRIPTION OF THE INVENTION

Example of First Embodiment

An arc processing machine according to a first exemplary embodiment of the present invention will now be described with reference to the drawings.

Figure 1:
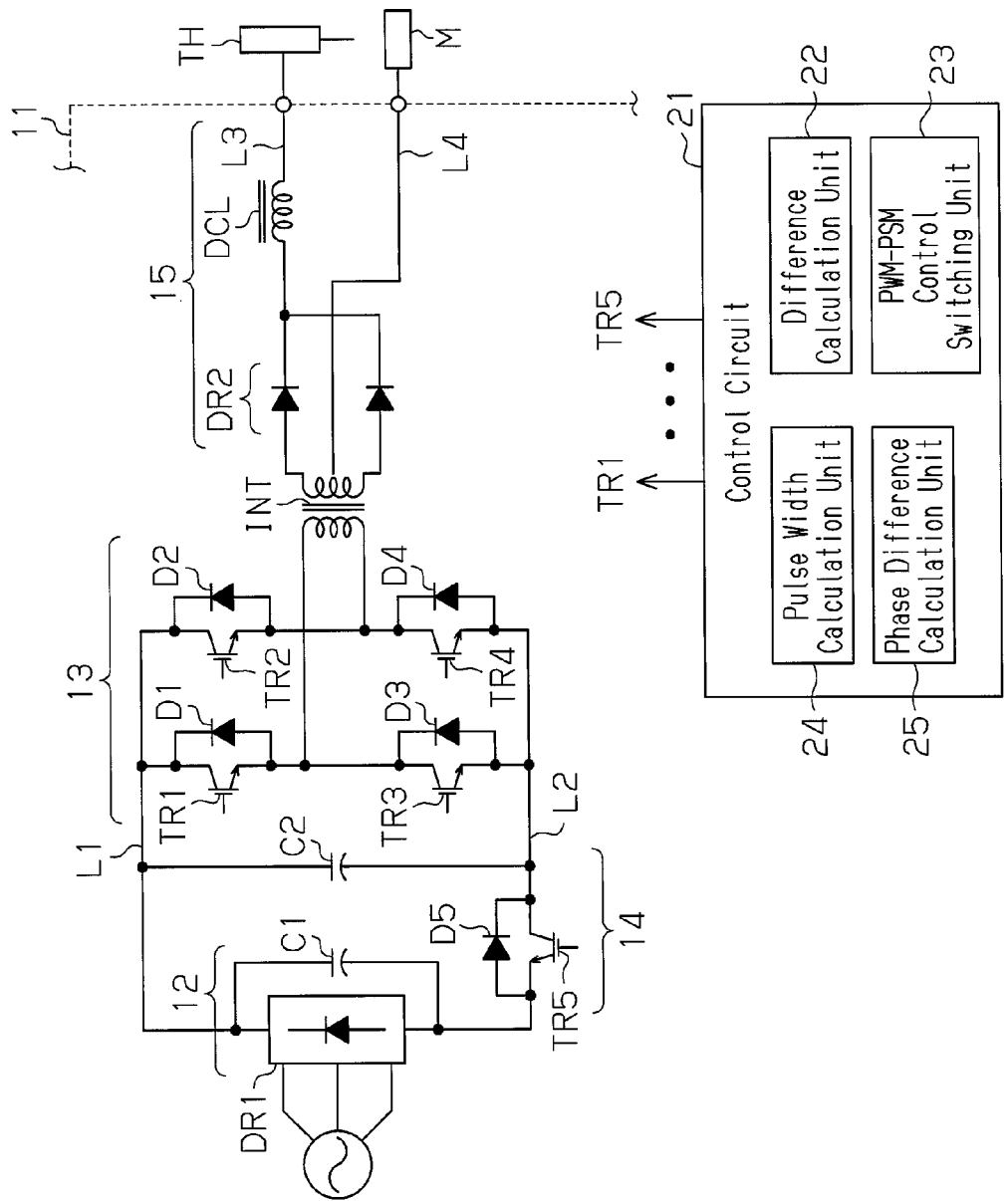
FIG. 1 is a circuit diagram of an arc processing power supply according to a first exemplary embodiment of the present invention.

As shown in FIG. 1, the arc processing machine includes an arc processing power supply 11 that generates output voltage, which is supplied to a torch TH. This generates an arc directed from the torch TH to a processing subject M to perform arc processing, such as arc welding or arc cutting, on the processing subject M.

The power supply 11 includes a DC conversion circuit 12, an inverter circuit 13, an auxiliary switching circuit 14, a transformer INT, and an output conversion circuit 15. The DC conversion circuit 12 includes a rectification circuit DR1, which is formed by a diode bridge, and a smoothing current Cl. The DC conversion circuit 12 converts three-phase input AC power, which is supplied from a commercial power supply, to DC power. Further, the DC conversion circuit 12 supplies the converted DC power to the inverter circuit 13 via two power lines L1 and L2.

The inverter circuit 13 is formed by a bridge circuit including two switching elements TR1 and TR2, such as insulated gate bipolar transistors (IGBTs), arranged closer to the power line L1, and two switching elements TR3 and TR4, such as IGBTs, arranged closer to the power line L2. Freewheeling diodes D1 to D4 are reversely connected to the switching elements TR1 to TR4, respectively. The gates of the switching elements TR1 to TR4 are provided with control pulse signals from a control circuit 21. The switching elements TR1 and TR4 form one set, and the switching elements TR2 and TR3 form another set. The two sets are alternately activated and deactivated. The activation and deactivation results in the switching elements TR1 to TR4 converting the input DC power to high frequency AC power. The converted high-frequency AC power is supplied to the transformer.

The auxiliary switching circuit 14 is arranged between the inverter circuit 13 and the DC conversion circuit 12 and includes a switching element TR5, such as an IGBT, an auxiliary capacitor C2, and a freewheeling diode D5. The freewheeling diode D5 is reverse-connected to the switching element TR5. The switching element TR5 and the freewheeling diode D5 are arranged on the power line L2 at the downstream side of the DC conversion circuit 12. The auxiliary capacitor C2 is arranged between the downstream side of the switching element TR5 and the inverter circuit 13 and connected to the power lines L1 and L2. The gate of the switching element TR5 receives a control pulse signal from the control circuit 21. The switching element TR5 is activated and deactivated in cooperation with the switching elements TR1 to TR4 of the inverter circuit 13. As a result, soft switching is performed thereby reducing switching losses in the switching elements TR1 to TR4 of the inverter circuit 13 and in the switching element TR5.

The transformer INT includes a primary coil and a secondary coil. The primary coil of the transformer INT is supplied with high frequency AC power from the switching elements TR1 to TR4. The transformer INT adjusts the voltage of the high frequency AC power and supplies high frequency AC power that has been adjusted to a predetermined voltage from its secondary coil to the output conversion circuit 15.

The output conversion circuit 15 includes a rectification circuit DR2 and a DC reactor DCL. The rectification circuit DR2 includes two diodes. The anodes of the two diodes are respectively connected to the two ends of the secondary coil in the transformer INT. The cathodes of the diodes are connected to the DC reactor DCL. The DC reactor DCL is arranged on an output line L3. An output line L4 is connected to an intermediate point of the secondary coil in the transformer INT. The output conversion circuit 15 converts the high frequency AC power from the transformer INT to DC output power, which is suitable for arc processing, with the rectification circuit DR2 and the DC reactor DCL.

The torch TH is connected to the output line L3, and the processing subject M is connected to the output line L4. The output power supplied to the torch TH through the output line L3 generates an arc between the torch TH and the processing subject M to perform arc processing, such as arc welding or arc cutting, on the processing subject M. The control circuit 21 controls the switching of the inverter circuit 13 to adjust the output power.

The control circuit 21 performs switching control in which the inverter circuit 13 cooperates with the auxiliary switching circuit 14. More specifically, the power supply 11 includes a detection sensor (not shown) that detects the actual values of the present output voltage and output current. Based on the detection value (actual value) of the detection sensor, the control circuit 21 performs switching control to obtain an output voltage that is suitable for the present state.

The control circuit 21 includes a difference calculation unit 22, a control switching unit 23, a pulse width calculation unit 24, and a phase difference calculation unit 25.

Figure 2:
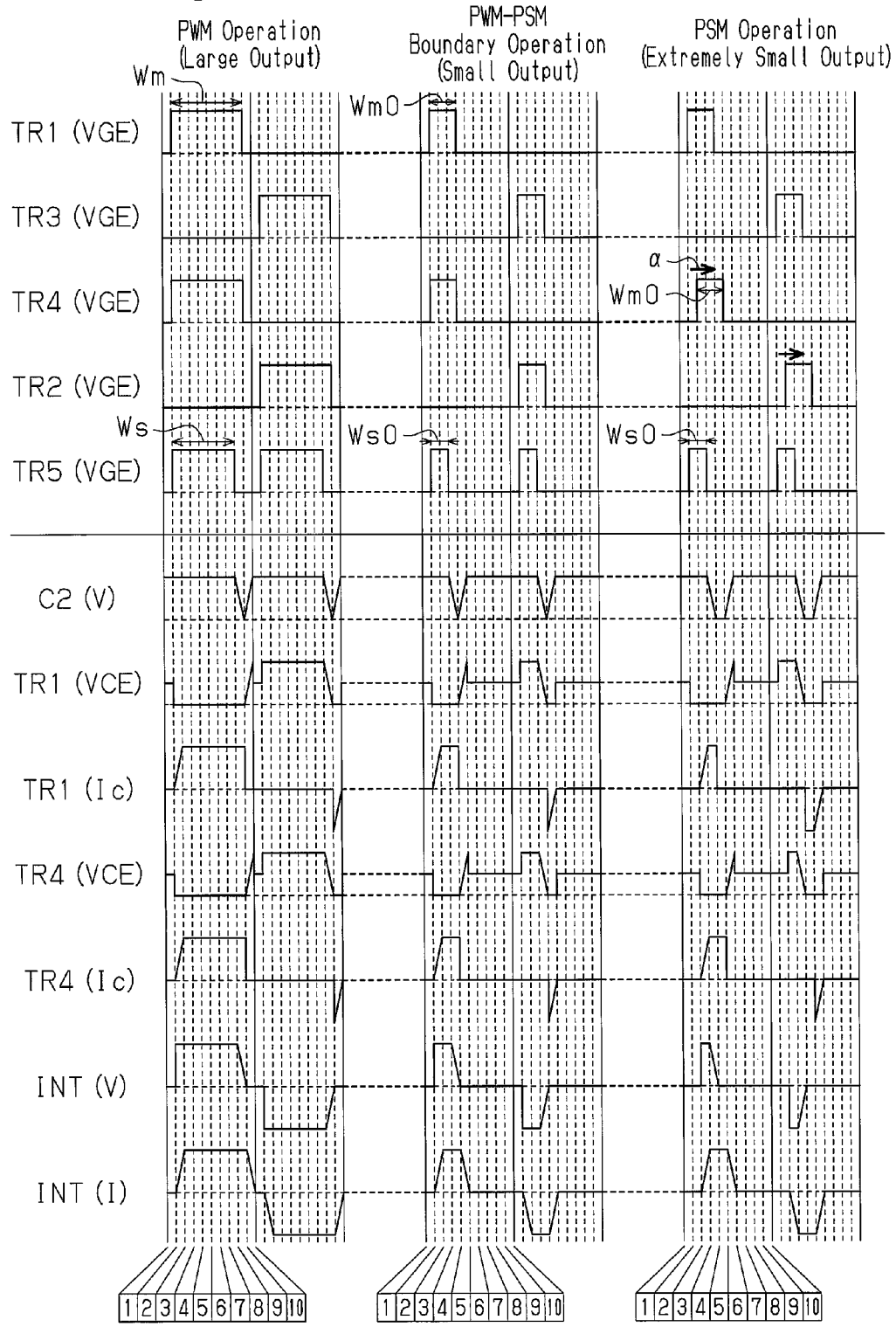
Figure 3:
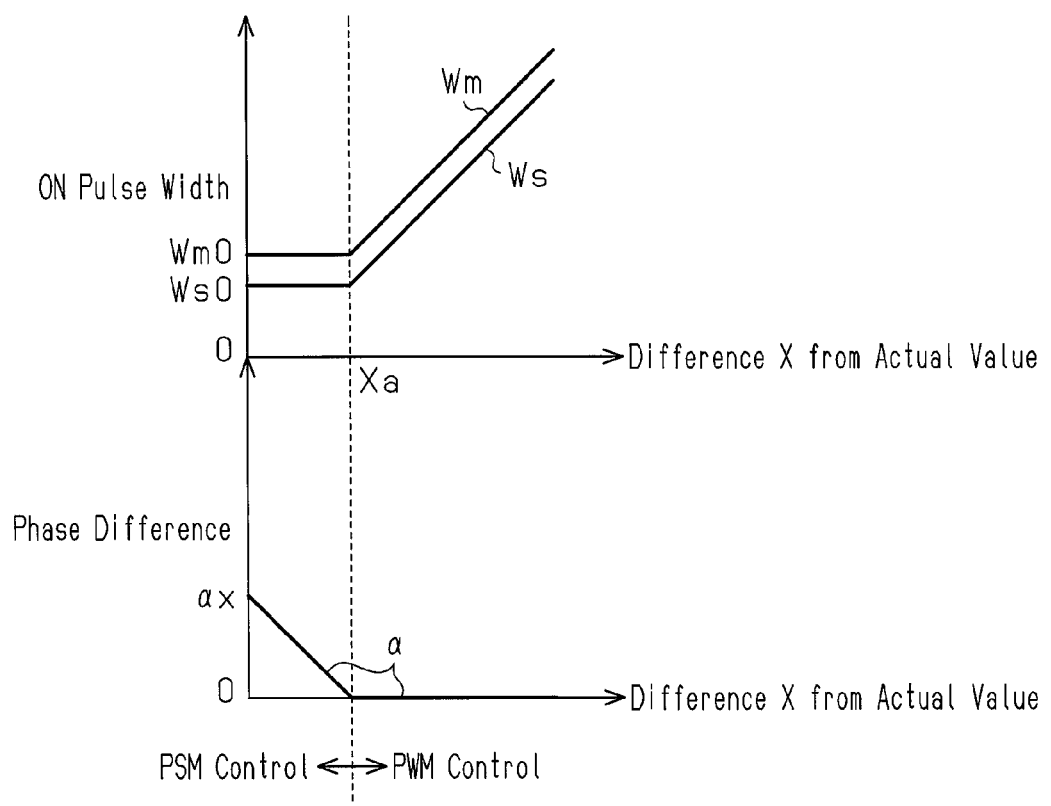
FIG. 3 is a chart illustrating PWM-PSM control in the first exemplary embodiment.

As shown in FIGS. 1 to 3, the difference calculation unit 22 of the control circuit 21 calculates a difference X between the present target value and actual value.

Based on the calculated difference X from the actual value, the control switching unit 23 of the control circuit 21 determines a switching control method for the inverter circuit 13. More specifically, when the calculated difference X is greater than a predetermined value (Xa), the control switching unit 23 performs pulse width modulation (PWM) control in the inverter circuit 13. When a small output voltage or a large output voltage is required by the power supply 11, the control switching unit 23 performs pulse width modulation (PWM) control. Based on the calculated difference X from the actual value, the pulse width calculation unit 24 of the control circuit 21 calculates an ON pulse width Wm of the switching elements TR1 to TR4 in the inverter circuit 13. Based on the calculated ON pulse width Wm, the pulse width calculation unit calculates an ON pulse width Ws of the switching element TR5 in the auxiliary switching circuit 14. When the calculated difference X increases, the ON pulse widths Wm and Ws are set to be wide. When the difference X from the actual value is small, the ON pulse widths Wm and Ws are set to be narrow. When the calculated difference X from the actual value reaches the predetermined value Xa, which is the lower limit value during PWM control, the ON pulse widths Wm and Ws are respectively set to minimum pulse widths Wm0 and Ws0, which are predetermined narrow pulse widths.

During PWM control, in the inverter circuit 13, the switching elements TR1 and TR4 of one set are simultaneously activated and deactivated, and the switching elements TR2 and R3 of the other set are simultaneously activated and deactivated. More specifically, during PWM control, the control circuit 21 provides each of the set of the switching elements TR1 and TR4 and the set of the switching elements TR2 and TR3 with two control pulse signals having the same ON pulse switch Wm and no phase difference. Further, the switching element TR5 of the auxiliary switching circuit 14 is simultaneously activated with the switching elements TR1 and TR4 and the switching elements TR2 and TR3. The switching element TR5 is deactivated before the switching elements TR1 to TR4. The control circuit 21 sets the ON pulse width Ws for the switching element TR5 to be narrower than the ON pulse width Wm for the switching elements TR1 to TR4 so that the rising edge of the ON pulse for the switching element TR5 conforms with the rising edge of each ON pulse for the switching elements TR1 to TR4 and so that the falling edge of the ON pulse for the switching element TR5 is earlier by a predetermined time than the falling edge of each ON pulse for the switching elements TR1 to TR4 (so that discharging of the auxiliary capacitor C2 is sufficiently or completely performed).

Thus, when the difference X from the actual value becomes small and the ON pulse widths Wm and Ws become narrow, a control signal having a narrow ON pulse width is set particularly for the switching element TR5 of the auxiliary switching circuit 14. As a result, the switching element TR5 may not be sufficiently activated. Accordingly, in the present exemplary embodiment, when calculating the predetermined value Xa, which is the lower limit value of the PWM control, the ON pulse width Ws of the control signal is set to the minimum pulse width Ws0, which is the lower limit allowing for sufficient activation of the switching element TR5 and he ON pulse width Wm of the control signal is set to the minimum pulse width Wm0, which is the lower limit allowing for sufficient activation of the switching elements TR1 to TR4.

In a range in which the difference X from the actual value is smaller than the predetermined value Xa, that is, when the power supply 11 requires an extremely small output voltage), the control switching unit 23 of the control circuit 21 switches the switching control of the inverter circuit 13 from PWM control to phase shift modulation (PSM) control. In this case, the phase of a control pulse signal provided to one of the switching elements in each set is referred to as a reference phase, and the phase of a control pulse signal provided to the other one of the switching elements in each set is referred to as a control phase. More specifically, the phase of a control pulse signal provided to each of the switching elements TR1 and TR3 is referred to as the reference phase, and the phase of a control pulse signal provided to each the switching elements TR4 and TR2 is referred to as the control phase. In this exemplary embodiment, the control pulse signals corresponding to the control phases are delayed by phase difference α from the control pulse signals corresponding to the reference phases so that the activation and deactivation of the switching elements TR4 and TR2 are delayed from the activation and deactivation of the switching elements TR1 and TR3. The phase difference calculation unit 25 of the control circuit 21 calculates the difference X based on the phase difference α. The phase difference α of the control pulse signal corresponding to the control phase from the control pulse signal corresponding to the reference phase is set to between zero (during PWM control) and a maximum phase difference αx so that the difference X from the actual value becomes smaller from the predetermined value Xa. The pulse width calculation unit 24 of the control circuit 21 fixes the ON pulse widths Wm and Ws of the switching elements TR1 to TR4 in the inverter circuit 13 and the switching element TR5 in the auxiliary switching circuit 14 to minimum pulse widths Wm0 and Ws0, respectively.

Consequently, the switching elements TR4 and TR2 corresponding to the control phases are delayed by the phase difference α from the switching elements TR1, TR3, and TR5 while holding the ON pulses of the control signals for the switching elements TR1 to TR5 at the minimum pulse widths Wm and Ws0 that allow sufficient activation. This adjusts the time at which the switching elements TR4 and TR2 corresponding to the control phase are simultaneously activated and the time at which the switching elements TR1 and TR3 are simultaneously activated and thereby adjusts the extremely small output.

The control circuit 21 performs the soft switching control that reduces switching losses of the switching element TR5 and the switching elements TR1 to TR4 by operating the switching element TR5 of the auxiliary switching circuit 14 in cooperation with the PWM control or PSM control of the switching elements TR1 to TR4 in the inverter circuit 13. The details of the soft switching will now be described.

The various controls performed by the control circuit 21 of the present exemplary embodiment will now be described with reference to FIGS. 2(a) to 2(c) that show the voltage and current waveform at different parts. FIGS. 2(a) to 2(c) each illustrate one control cycle, and one half of the cycle during which the switching elements TR1 and TR4 are activated is finely divided into periods t1 to t10. Periods t1 to t10 are indicated by only numbers at the lower parts of FIGS. 2(a) to 2(c). Further, TR1(VGE) to TR5(VGE) indicate control pulse signals (gate voltages) supplied to the switching elements TR1 to TR5. C2(V) indicates the voltage between the terminals of the auxiliary capacitor C2. TR1(VCE) and TR4(VCE) indicate the voltages between the terminals of the switching elements TR1 and TR4. TR1(Ic) and TR4(Ic) indicate the current flowing through the switching elements TR1 and TR4. INT(V) and INT(I) are the voltage between the terminals of the primary coil in the transformer INT and the current flowing through the coil.

Example of PWM Control

FIG. 2(a) shows a case in which a large output is required, and the ON pulse width Wm of the switching elements TR1 and TR4 continues from periods t2 to t8.

Period t1 is a dead time period. Thus, the switching elements TR1, TR4, and TR5 remain deactivated during period t1. Here, the auxiliary capacitor C2 is in a charged state, and the voltage between the terminals of the auxiliary capacitor C2 is equal to the voltage between the terminals of the DC conversion circuit 12.

During period t2, the switching elements TR1 and TR4 of the inverter circuit 13 and the switching element TR5 of the auxiliary switching circuit 14 are simultaneously activated. In this state, due to the leakage inductance at the primary coil of the transformer INT, the current applied to the switching elements TR1, TR4, and TR5 rises gradually from zero. Thus, the switching elements TR1, TR4, and TR5 are activated by a zero or extremely small current (hereafter, referred to as zero current). This reduces the switching losses of the switching elements TR1, TR4, and TR5. Further, since the voltage between the terminals of the DC conversion circuit 12 is equal to the voltage between the terminals of the auxiliary capacitor C2, the switching element TR5 is activated by a zero or extremely small voltage (hereafter referred to as zero voltage). This further reduces the switching loss. When the switching elements TR1, TR4, and TR5 are activated, the DC power from the DC conversion circuit is supplied to the primary coil of the transformer INT via the switching elements TR5 and the switching elements TR1 and TR4.

During periods t3 to t8, the switching elements TR1 and TR4 in the inverter circuit 13 and the switching element TR5 in the auxiliary switching circuit 14 are continuously activated from period t2. The DC power from the DC conversion circuit 12 is continuously supplied to the primary coil of the transformer INT. Thus, the output voltage of the power supply generated from the secondary coil of the transformer INT becomes large.

During period t9, the switching element TR5 of the auxiliary switching circuit 14 is deactivated before the switching elements TR1 and TR4 of the inverter circuit 13. In this state, the voltage between the terminals of the DC conversion circuit 12 is equal to the voltage between the terminals of the auxiliary capacitor C2. Thus, the switching element TR5 is deactivated by a zero voltage and switching loss is reduced. Based on the deactivation of the switching element TR5, the supply of DC power from the DC conversion circuit 12 to the downstream side is stopped, and the supply of DC current from the charged auxiliary capacitor C2 to the transformer INT is continued. During period t9, the discharging of the auxiliary capacitor C2 gradually decreases the voltage between the terminals of the auxiliary capacitor C2. During the next period, the voltage between the terminals becomes zero or extremely small. This decreases the voltage between the terminals of the primary coil in the transformer INT. The current flowing through the primary coil of the transformer INT is maintained.

During period t10, the switching element TR1 and TR4 of the inverter circuit 13 are deactivated. In this state, the auxiliary capacitor C2 is discharged from period t9. Thus, the switching elements TR1 and TR4 are deactivated by a zero voltage, and the switching losses of the switching elements TR1 and TR4 are reduced. The deactivation of the switching elements TR1 and TR4 accumulates electromagnetic energy in the primary coil (leakage inductance) of the transformer INT. The accumulated electromagnetic energy generates return current that flows via the freewheeling diodes D3 and D2 and charges the auxiliary capacitor C2. The voltage between the terminals of the auxiliary capacitor C2 is charged to the same voltage as the voltage between the terminals of the DC conversion circuit 12 until period t10 ends. Then, the return current gradually decreases. When the electromagnetic energy accumulated in the primary coil (leakage inductance) of the transformer INT is insufficient, a reactor is inserted in series with the primary coil of the transformer INT.

In this manner, the half of the cycle in which the switching elements TR1 and TR4 operate ends. In the next half of the cycle, the switching elements TR2 and TR3 operate. Accordingly, the set of the switching elements TR1 and TR4 and the set of the switching elements TR2 and TR3 are alternately switched between an activated state and a deactivated state.

FIG. 2(b) shows a case in which a small output is required, and PWM control is performed between the boundary of PWM control and PSM control. More specifically, the ON pulse width Wm of the control signals for the switching elements TR1 and TR4 is set to the minimum pulse width Wm0 and continued during the periods t2 to t4. The ON pulse width of the control signal for the switching elements TR5 is set to the minimum pulse width Ws0 and continued during the periods t2 to t3.

Period t1 is a dead time period. Thus, the switching elements TR1, TR4, and TR5 are deactivated during period t1. Here, the auxiliary capacitor C2 is in a charged state.

During period t2, the switching elements TR1 and TR4 of the inverter circuit 13 and the switching element TR5 of the auxiliary switching circuit 14 are simultaneously activated. The switching elements TR1 and TR4 are activated by a zero current. The switching element TR5 is activated by a zero current or a zero voltage. This reduces the switching losses of the switching elements TR1, TR4, and TR5. When the switching elements TR1, TR4, and TR5 are activated, the DC power from the DC conversion circuit is supplied to the primary coil of the transformer INT.

During period t3, the switching elements TR1 and TR4 in the inverter circuit 13 and the switching element TR5 in the auxiliary switching circuit 14 are continuously activated from period t2. Thus, DC power is supplied for a shorter time than FIG. 2(a). In other words, the output voltage of the power supply 11 generated from the secondary coil of the transformer INT is smaller than that of FIG. 2(a).

During period t4, the switching element TR5 of the auxiliary switching circuit 14 is deactivated before the switching elements TR1 and TR4 of the inverter circuit 13. The switching element TR5 is deactivated by a zero voltage and switching loss is reduced. When the switching element TR5 is deactivated, the supply of DC power from the DC conversion circuit 12 to the downstream side is stopped, and the auxiliary capacitor C2 is discharged.

During period t5, the switching elements TR1 and TR4 of the inverter circuit 13 are deactivated. In this state, the switching elements TR1 and TR4 are deactivated by a zero voltage, and switching losses of the switching elements TR1 and TR4 are reduced. Further, return current that flows through the freewheeling diodes D3 and D2 is generated, and the auxiliary capacitor C2 is charged.

During periods t6 to t10, the switching elements TR1, TR4, and TR5 remain deactivated. Thus, the output voltage is not generated during periods t6 to t10.

In this manner, the half of the cycle in which the switching elements TR1 and TR4 operate ends. In the next half of the cycle, the switching elements TR2 and TR3 operate.

During PWM control, the ON pulse width Wm of the control signals for the switching elements TR1 to TR4 is changed during periods t2 to t4 based on the difference X from the actual value to adjust the output voltage. At the same time, the ON pulse width Ws of the control signal for the switching element TR5 is changed between a width of periods t2 to t3 and a width of periods t2 to t8. Even if the ON pulse widths Wm and Ws are set to the minimum pulse widths Wm0 and Ws0, the switching elements TR1 to TR4 and, in particular, the switching element TR5 can be activated sufficiently. When the ON pulse widths Wm and Ws are set to less than the minimum pulse widths Wm0 and Ws0, PSM control is performed.

Example of PSM Control

FIG. 2(c) shows a case in which an extremely small output is required and PSM control is performed. The control signal for the switching element TR1 corresponding to the reference phase is set to have an ON pulse width Wm extending between periods t2 to t4, and the control signal for the switching element TR4 corresponding to the control phase is set to have an ON pulse width Wm extending between periods t3 to t5. The minimum pulse width Wm0 is maintained for the switching element TR1 corresponding to the reference phase and the switching element TR4 corresponding to the control phase. Thus, the ON pulse of the switching element TR4 corresponding to the control phase is phase-shifted from periods t2 to t4 to periods t3 to t5. This produces a phase difference α. The ON pulse width Ws of the control signal for the switching element TR5 is set to the minimum pulse width Ws0 that continues during period t2 to t3. This maintains the minimum pulse width Ws0.

Period t1 is a dead time period. Thus, the switching elements TR1, TR4, and TR5 are deactivated during period t1, and the auxiliary capacitor C2 is in a charged state.

During period t2, the switching element TR1, which corresponds to the reference phase in the inverter circuit 13, and the switching element TR5 of the auxiliary switching circuit 14 are simultaneously activated. In this state, the switching element TR4 corresponding to the control phase remains deactivated. Thus, the switching element TR1 is activated by zero current, and the switching element TR5 is activated by zero current or zero voltage. This reduces switching losses in the switching elements TR1 and TR5. Since the switching elements TR1 and TR5 are activated and the switching element TR4 is deactivated, the supply of DC power from the DC conversion circuit 12 to the transformer INT is not started.

During period t3, the switching element TR4 corresponding to the control phase is activated. In this state, the leakage inductance at the primary coil of the transformer INT activates the switching element TR4 with zero current and reduces the switching loss. The switching elements TRR1 and TR5 have been activated in period t2, and the switching element TR4 is activated in period t3. Thus, DC power from the DC conversion circuit is supplied to the primary coil of the transformer INT. In this manner, DC power is supplied from the DC conversion circuit 12 to the primary coil of the transformer INT in a period that is further shorter than the case shown in FIG. 2(b). Thus, the output power of the power supply 11 is extremely small.

During period t4, the switching element TR5 of the auxiliary switching circuit 14 is deactivated before the switching elements TR1 and TR4 of the inverter circuit 13. The switching element TR5 is deactivated by a zero voltage. This reduces a switching loss. When the switching element TR5 is deactivated, the charged auxiliary capacitor C2 continues to supply DC power to the transformer INT. This discharges the auxiliary capacitor C2.

During period t5, the switching element TR1 corresponding to the reference phase in the inverter circuit 13 is deactivated before the switching element TR4 corresponding to the control phase. The discharging of the auxiliary capacitor C2 deactivates the switching element TR1 with zero voltage. This reduces switching loss. In this state, return current flows through the switching element TR4 and the freewheeling diode D3. However, the auxiliary capacitor C2 is not charged and remains in a discharged state.

During period t6, the switching element TR4 corresponding to the control phase is deactivated. Here, the auxiliary capacitor C2 is still in a discharged state. Thus, the switching element TR4 is deactivated by a zero voltage, and the switching loss is reduced. The deactivation of the switching element TR4 switches the path in which return current flows through the freewheeling diodes D3 and D2 and charges the auxiliary capacitor C2.

During periods t7 to t10, the switching elements TR1, TR4, and TR5 remain deactivated. Thus, the output voltage is not generated during periods t7 to t10.

In this manner, the half of the cycle in which the switching elements TR1 and TR4 operate ends. In the next half of the cycle, the switching elements TR2 and TR3 operate.

During PSM control, the ON pulse width Wm of the control signals for the switching elements TR1 to TR4 and the ON pulse width Ws of the control signal for the switching element TR5 are fixed to the minimum pulse widths Wm0 and Ws0. Further, by changing the phase difference α between the control pulse signal corresponding to the reference phase, which is calculated based on the difference X from the actual value, and the control pulse signal corresponding to the control phase, the output voltage is adjusted when an extremely small output is required. Accordingly, the switching elements TR1 to TR4 and, in particular, the switching element TR5 can still be sufficiently activated.

During period t5, the switching element TR1 (TR3) is deactivated, the switching element TR4 (TR2) is activated, and return current flows through the switching element TR4 (TR2) and the freewheeling diode D3 (D1). As a result, current flows to the primary coil of the transformer INT in the same manner as in FIG. 2(b). However, in the case of FIG. 2(c), the voltage between the terminals of the primary coil in the transformer INT decreases before the case shown in FIG. 2(b). This reduces the output power of the power supply 11 and generates an extremely small output as required.

When performing PSM control, the switching element TR5 is set to the minimum pulse width Ws that allows for sufficient activation of the switching element TR5. The control pulse signal is set to the minimum pulse width Wm0 of the switching elements TR1 to TR4 corresponding to the minimum pulse width Ws0 and phase-shifted. Thus, the switching element TR1 (TR3) is deactivated, the switching element TR4 (TR2) is activated, and return current flows through the switching element TR4 (TR2) and the freewheeling diode D3 (D1). As a result, the return current is limited to an extremely short time of only period t5. This allows for reduction in conductance loss of the return current and lowers power consumption.

In this manner, in the power supply 11 of the present embodiment, when an output power in which the difference X from the actual value is greater than the predetermined value Xa is required, PWM control is performed on the inverter circuit 13 to adjust the ON pulse width Wm of the control pulse signal. When an extremely small output power in which the difference X from the actual value is smaller than the predetermined value Xa is required, PSM control is performed on the inverter circuit 13 using a control pulse signal having the minimum pulse width Wm0 for PWM control. This ensures activation of the switching elements TR1 to TR4 of the inverter circuit 13 and the switching element TR5 of the auxiliary switching circuit 14 corresponding to the control pulse signal having a particularly narrow ON pulse width, even when an extremely small output is required. In addition, the output is stabilized, and biased magnetization does not occur. Further, the control pulse signal having the minimum pulse width Wm0 is phase-shifted. Thus, the time during which return current is generated in the inverter circuit 13 can be shortened, and conductance loss of the return current can be reduced.

In the arc processing power supply 11 of the present exemplary embodiment, due to its characteristics, when an extremely small output is required such that PSM control is performed, a large output current is often generated, and the time during which return current is generated in the inverter circuit 13 tends to be long. In the present exemplary embodiment, the ON pulse width Wm is set to the minimum pulse width Wm0. This effectively reduces such return current and is particularly effective for the arc processing power supply 11.

The present example of the first embodiment has the advantages described below.

(1) The control circuit 21 includes the pulse width calculation unit 24, which is used to perform PWM control, and a phase difference calculation unit 25, which is used to perform PSM control. The control switching unit 23 of the control circuit 21 performs PWM control when the required output power is such that control pulse signals having ON pulse widths Wm and Ws that are longer than a predetermined pulse width allowing for sufficient activation of the switching elements TR1 to TR5 in the inverter circuit 13 and the auxiliary switching circuit 14, namely, the minimum pulse widths Wm0 and Ws0 in the preset exemplary embodiment. When an extremely small output is required such that control pulse signals are set to have ON pulse widths Wm and Ws that are smaller than the minimum pulse widths Wm0 and Ws0, the control switching unit 23 fixes the ON pulse widths Wm and Ws to the minimum pulse widths Wm0 and Ws0, and in this state, switches to PSM control that adjusts the phase of the control pulse signal. More specifically, during PWM control, when an extremely small output that sets the ON pulse widths Wm and Ws of the control pulse widths to be smaller than the minimum pulse widths Wm0 and Ws0, continuance of the PWM control may hinder activation of the switching elements TR1 to TR4 in the inverter circuit 13 and, in particular, the switching element TR5 of the auxiliary switching circuit 14. Thus, when an extremely small output is required, PWM control is switched to PSM control that fixes the ON pulse widths Wm and Ws of the control pulse signal to the minimum pulse widths Wm0 and Ws0 when an extremely small output is required. Accordingly, activation of the switching elements TR1 to TR5 is ensured while maintaining the ON pulse widths Wm and Ws at the minimum pulse widths Wm0 and Ws0. This obtains a stable output when an extremely small output is required. Further, when PSM control is performed, in the set of the switching elements TR1 and TR4 and the set of the switching elements TR2 and TR3 in the inverter circuit, after one of the switching elements (TR1 and TR3) in each set is deactivated, there is time during which only the other one of the switching elements (TR4 and TR2) in each set is activated. This generates return current in the inverter circuit 13. Conductance loss of the return current hinders efficient power consumption. However, the ON pulse width Wm is set to the minimum pulse width Wm0, and the time during which return current is generated can be sufficiently shortened. This sufficiently reduces conductance loss of the return current and lowers power consumption.

(2) In the PSM control of the present exemplary embodiment, the phase of the control pulse signal sent to the inverter circuit 13 as the reference phase (switching elements TR1 and TR3) is fixed in the same manner as the phase of the control pulse signal set to the auxiliary switching element. Thus, only the control pulse signal corresponding to the control phase (switching elements TR4 and TR2) are phase-adjusted. In other words, only one control pulse signal needs to be phase-adjusted. This facilitates phase adjustment.

(3) The reference phase of the control pulse signal for each of the switching elements TR1 and TR3 output to the inverter circuit 13 rises immediately after the dead time period (period t1). The control phase of the control pulse signal for each of the switching elements TR4 and TR2 is delayed from the reference phase. The control pulse signal output to the auxiliary switching circuit 14 output to the control pulse signal rises when the control pulse signal corresponding to the reference phase rises. The control pulse signal output to the auxiliary switching circuit 14 is set to have a narrower ON pulse width than the control pulse signal output to the inverter circuit 13. In this case, by setting a wider ON pulse width, the output can be lowered and the frequency can be increased.

(4) The predetermined narrow pulse width used to determine switching from PWM control to PSM control is set to the minimum pulse widths Wm0 and Ws0 in the present exemplary embodiment to allow sufficient activation of the switching elements TR1 to TR5 in the inverter circuit 13 and the auxiliary switching circuit 14. This minimizes shifting to the PSM control and minimizes the return current produced in the inverter circuit 13 during PSM control. Thus, power consumption is lowered.

(5) The PWM control of the present exemplary embodiment changes the ON pulse width Wm of the two control pulse signals corresponding to the reference phase and control phase output to the inverter circuit 13 in the same manner. Thus, a common control pulse signal can be used for the reference phase and the control phase, and the control circuit 21 can be simplified.

The example of the first embodiment may be modified as described below.

In the PSM control of the first exemplary embodiment, the control phase of the control pulse signal for the switching elements TR4 and TR2 is delayed from the reference phase of the control pulse signal output to the inverter circuit 13 for the switching elements TR1 and TR3. Instead, the control phase may be advanced from the reference phase as long as the dead time period allows such advancement.

In the PSM control of the first exemplary embodiment, the reference phase of the control pulse signal output to the inverter circuit 13 for the reference phases TR1 and TR3 is fixed, and the control phase of the control pulse signal for the switching elements TR4 and TR2 is shifted. However, the shifted subject may be changed. Further, the shifted subject may be changed during PSM control. In addition, the control phase and the reference phase may both be shifted for the control pulse signals of the switching elements TR1 to TR4.

In the PSM control of the first exemplary embodiment, the phase of the control pulse signal output to the auxiliary switching circuit 14 is fixed but may be shifted. During such shifting, the ON pulse width Ws may be changed as long as the ON pulse width Ws ensures sufficient activation.

In the example of the first embodiment, the predetermined narrow pulse width used to determine switching from PWM control to PSM control is set to the minimum pulse widths Wm0 and Ws0. However, the predetermined narrow pulse width does not have to be a minimum and may be a pulse width that is narrow for a certain degree.

The configuration of the power supply 11 in the first exemplary embodiment may be changed by a certain degree. For example, the switching element TR5 of the switching circuit 14 is arranged on the power supply line L2 but may be arranged on the power supply line L1 or be arranged on both of the power supply lines L1 and L2. The output conversion circuit 15 is configured by the rectification circuit DR2 and the DC reactor DCL. However, the configuration may be changed in accordance with the load. Further, the DC conversion circuit 12 is used to convert the AC input power from a commercial power supply into AD power. However, the DC conversion circuit 12 may be eliminated if the input is DC power. Alternatively, a voltage conversion circuit may be used instead.

The power supply 11 of the first exemplary embodiment is an arc processing power supply but may be another type of a power supply.

Example of Second Embodiment

A second exemplary embodiment of the present invention will now be described with reference to the drawings. In the present exemplary embodiment, the power supply 11 shown in FIG. 1 performs the control shown in FIG. 4 with the control circuit 21.

As shown in FIGS. 4(a) and 4(b), during a period in which PWM control is performed when a large output or small output is required, PWM control is performed by changing the ON pulse width Wm of the two control pulse signals for the switching elements TR1 and TR4 of the same set in the inverter circuit in the same manner as the first exemplary embodiment and also by changing the ON pulse width Wm of the two control pulse signals for the switching elements TR2 and TR3 in the same manner. The control pulse signal output to the switching element TR5 of the auxiliary switching circuit 14 rises at the same time as the control pulse signal output to the inverter circuit 13 and falls before the control pulse signal output to the inverter circuit 13.

As shown in FIG. 4(c), if PSM control is performed when an extremely small output is required, the four control pulse signals output to the inverter circuit 13 has a constant fixed pulse width Wm0, which is switched from PWM control to PSM control, and a constant phase. That is, the two control pulse signals for the switching elements TR1 and TR4 in the same set are set to the same ON pulse having no phase difference even during PSM control. In contrast, the control pulse signal output to the switching element TR5 of the auxiliary switching circuit 14 has a constant minimum pulse width Ws0 that switches from PWM control to PSM control. Further, the phase of the control pulse signal output to the switching element TR5 is advanced from the phase of the control pulse signal output to the inverter circuit 13. The setting of the advanced shifting amount (phase difference α) is calculated based on the difference X between the present target value and actual value.

Accordingly, during PSM control in which an extremely small output is required, activation is ensured for the switching elements TR1 to TR5 of the inverter circuit 13 and the auxiliary switching circuit 14. Further, a decrease in the conductance time (power transmission time) resulting from the phase adjustment in the inverter circuit 13 and the auxiliary switching circuit 14 allows for the extremely small output as required.

The activation and deactivation of the switching element TR5 in the auxiliary switching circuit 14 is advanced but the soft switching operation of the switching element TR5 is maintained. This reduces switching losses in the switching elements TR1 to TR5 of the inverter circuit 13 and the auxiliary switching circuit 14.

The present exemplary embodiment has the advantages described below.

(1) The PSM control of the present exemplary embodiment fixes the phases of the four control pulse signals output to the switching elements TR1 to TR4 of the inverter circuit 13 and advances the phase of the control pulse signal output to the switching element TR5 of the auxiliary switching circuit 14. In the same manner as the first exemplary embodiment, the ON pulse widths Wm and Ws are maintained at the minimum pulse widths Wm0 and Ws0 that ensure activation of the switching elements TR1 to TR5 in inverter circuit 13 and the auxiliary switching circuit 14. Thus, the output is stabilized even when a small output is required and PSM control is performed. Further, return current is produced even when such PSM control is performed. However, the ON pulse widths Wm and Ws are set to the minimum pulse widths Wm0 and Ws0. This sufficiently shortens the time during which the return current is produced, reduces the conductance loss of the return current, and lowers power consumption.

(2) The PSM control of the present exemplary embodiment only adjusts the phase of the control pulse signal output to the auxiliary switching circuit 14. In other words, only one control pulse signal needs to be phase-adjusted. This facilitates phase adjustment.

Example of Third Embodiment

A third exemplary embodiment of the present invention will now be described with reference to the drawings. The present exemplary embodiment slightly differs from the second exemplary embodiment in the control that is performed as shown in FIG. 5.

As shown in FIG. 5, regardless of whether the PWM control or PSM control is performed, the ON pulse width Wm of the control pulse signals output to the switching elements TR1 and TR3 of the inverter circuit 13 corresponding to the reference phases and are constantly fixed to the maximum width Wmx. During PWM control, the ON pulse width Wm of the control pulse signals for the switching elements TR4 and TR2 corresponding to the control phases are changed. During PSM control, the phase of the control pulse signal output to the auxiliary switching circuit 14 is adjusted.

The present example of the third embodiment has the advantages described below.

(1) The present exemplary embodiment stabilizes output when an extremely small output is required and lowers power consumption.

(2) In the PWM control of the present exemplary embodiment, the two control pulse signals output to the switching elements TR1 and TR3 in the inverter circuit 13 and corresponding to the reference phases have the constant maximum width Wmx. Further, the ON pulse width Wm of the two control pulse signals for the switching elements TR4 and TR2 corresponding to the reference phase is changed. This eliminates the need for resetting the ON pulse width Wm of the control pulse signal corresponding to the reference phase. Thus, the generation of the control pulse signal is facilitated.

Example of Fourth Embodiment

A fourth exemplary embodiment of the present invention will now be described with reference to the drawings. The present exemplary embodiment slightly differs from the second exemplary embodiment in the control that is performed as shown in FIG. 6.

As shown in FIG. 6, in the PSM control of the fourth exemplary embodiment, the phases of the four control pulse signals output to the switching elements TR1 to TR4 in the inverter circuit 13 are fixed. The phase of the control pulse signal output to the switching element TR5 of the auxiliary switching circuit 14 is delayed from phases of the switching elements TR1 to TR4. The setting of the shifting amount (phase difference α) to the delayed phase is calculated based on the difference X between the present target value and actual value in the same manner as the first to third exemplary embodiments.

The example of the fourth embodiment has the advantages described below.

(1) The fourth exemplary embodiment also stabilizes output when an extremely small output is required. In the PSM control of the fourth exemplary embodiment, the activation and deactivation of the switching element TR5 of the auxiliary switching circuit 14 is slower than the activation and deactivation of the switching elements TR1 to TR4 of the inverter circuit 13 that operates in correspondence with the switching element TR5. Thus, a soft switching operation is not performed, and a switching loss cannot be reduced. However, the PSM control is performed when the output is low and the amount of involved power is small. Further, the switching loss reduction effect of the soft switching operation is extremely small. This lowers power consumption.

The second to fourth exemplary embodiments may be modified as described below.

In the second exemplary embodiment, the phases of the control pulse signals output to the auxiliary switching circuit 14 are shifted to PSM control. However, the control phases of the control pulse signals for the switching elements TR4 and TR2 of the inverter circuit 13 may be shifted in the same manner as in the first exemplary embodiment.

The modifications of the first exemplary embodiment may be applied to the second to fourth exemplary embodiments.

In the second to fourth exemplary embodiments, the switching of PWM control and PSM control is performed based on the ON pulse widths Wm and Ws (minimum pulse widths Wm0 and Ws0) of the control pulse signals. However, the switching of the controls is not limited in such a manner. For example, the control may be switched based on a target value set by a user of an arc processing machine. More specifically, when large output to small output is set, PWM control is performed, and when set to extremely small output, PSM control is performed. Such switching may also be applied to the first exemplary embodiment.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A power supply comprising: first and second power lines;
    an inverter circuit including two pairs of switching elements connected between the first power line and the second power line, wherein the inverter circuit performs a switching operation that alternately activates and deactivates the two pairs of switching elements, and the inverter circuit converts input DC power to high frequency AC power;
    an auxiliary switching circuit including an auxiliary switching element and an auxiliary capacitor, wherein the auxiliary switching element is operated in cooperation with the switching operation of the inverter circuit, the auxiliary switching element includes a first terminal connected to the first power line and a second terminal that receives the DC power, and the auxiliary capacitor is connected between the first terminal of the auxiliary switching element and the second power line,
    wherein the power supply performs output control, which controls the switching operation of the inverter circuit to adjust output power that is supplied to a load, and soft switching control, which deactivates the auxiliary switching element before the two pairs of switching elements are deactivated to reduce switching loss of the two pairs of switching elements;
    a pulse width modulation control unit that adjusts ON pulse widths of two pairs of control pulse signals respectively provided to the two pairs of switching elements and adjusts an ON pulse width of an auxiliary control pulse signal provided to the auxiliary switching element in accordance with the two pairs of control pulse signals;
    a phase shift control unit that adjusts a phase difference of the control pulse signals in each pair provided to the two pairs of switching elements or adjusts a phase difference of the two pairs of control pulse signals and the auxiliary control pulse signal; and
    a control switching unit that selectively switches the pulse width modulation control unit and the phase shift control unit so that the pulse width modulation control unit operates when a relatively large output power is required and the phase shift control unit operates when a relatively small output power is required.

2. The power supply according to claim 1, wherein the pulse width modulation control unit changes, in the same manner, the ON pulse widths of the two control pulse signals that are provided to each pair of the switching elements.

3. The power supply according to claim 1, wherein the pulse width modulation control unit uses one of the two control pulse signals provided to each pair of the switching elements as a reference phase control pulse signal and the other one of the two control pulse signals as a control phase control pulse signal, fixes the ON pulse width of the reference phase control pulse signal at a maximum width, and changes the ON pulse width of the control phase control pulse signal.

4. The power supply according to claim 1, wherein the phase shift control unit adjusts the phase difference of the two pairs of control pulse signals and the auxiliary control pulse signal, fixes the phases of the two pairs of control pulse signals, and adjusts the phase of only the auxiliary control pulse signal.

5. The power supply according to claim 1, further comprising:
    a transformer including a primary coil and a secondary coil, wherein the transformer adjusts voltage of the high frequency AC power, which is generated by the inverter circuit and supplied to the primary coil, and outputs voltage-adjusted high frequency AC power from the secondary coil; and
    an output conversion circuit that converts the voltage-adjusted high frequency AC power, which is supplied from the transformer, to output power that is in accordance with the load.

6. An arc processing power supply using the power supply according to claim 1 to generate arc processing output power.

7. A power supply comprising:
    first and second power lines;
    an inverter circuit including two pairs of switching elements connected between the first power line and the second power line, wherein the inverter circuit performs a switching operation that alternately activates and deactivates the two pairs of switching elements, and the inverter circuit converts input DC power to high frequency AC power;

an auxiliary switching circuit including an auxiliary switching element and an auxiliary capacitor, wherein the auxiliary switching element is operated in cooperation with the switching operation of the inverter circuit, the auxiliary switching element includes a first terminal connected to the first power line and a second terminal that receives the DC power, and the auxiliary capacitor is connected between the first terminal of the auxiliary switching element and the second power line, wherein the power supply performs output control, which controls the switching operation of the inverter circuit to adjust output power that is supplied to a load, and soft switching control, which deactivates the auxiliary switching element before the two pairs of switching elements are deactivated to reduce switching loss of the two pairs of switching elements;

a pulse width modulation control unit that adjusts ON pulse widths of two pairs of control pulse signals respectively provided to the two pairs of switching elements and adjusts an ON pulse width of an auxiliary control pulse signal provided to the auxiliary switching element in accordance with the two pairs of control pulse signals;

a phase shift control unit that adjusts a phase difference of the control pulse signals in each pair provided to the two pairs of switching elements or adjusts a phase difference of the two pairs of control pulse signals and the auxiliary control pulse signal; and a control switching unit that selectively switches the pulse width modulation control unit and the phase shift control unit so that the pulse width modulation control unit operates when the output power is required and the ON pulse widths of the two pairs of control pulse signals and the auxiliary control pulse signal are set to a predetermined pulse width or greater, and the phase shift control unit operates when the ON pulse widths of the two pairs of control pulse signals and the auxiliary control pulse signal will be smaller than the predetermined pulse width, wherein the phase shift control unit fixes the ON pulse widths of the two pairs of control pulse signals and the auxiliary pulse signal to the predetermined pulse width when the output power is required and the ON pulse widths will be smaller than the predetermined pulse width.

8. The power supply according to claim 7, wherein the phase shift control unit adjusts the phase difference of the two control pulse signals provided to each pair of switching elements, and the phase shift control unit uses one of the two control pulse signals as a reference phase control pulse signal and the other one of the two control pulse signals as a control phase control pulse signal, fixes a phase of the reference phase control pulse signal in the same manner as a phase of the auxiliary control pulse signal, and adjusts a phase of only the control phase control pulse signal.

9. The power supply according to claim 8, wherein
the reference phase control pulse signal includes an ON pulse that rises after a dead time period,
the phase of the control phase control pulse signal is delayed from the phase of the reference phase control pulse signal, and
the auxiliary control pulse signal includes an ON pulse that rises at the same time as when the reference phase control pulse signal rises.

10. The power supply according to claim 7, wherein the predetermined pulse width is set to a minimum pulse width that allows for sufficient activation of each of the switching elements in the inverter circuit and the auxiliary switching circuit.

* * * * *